US011623278B2

(12) United States Patent
Eonta et al.

(10) Patent No.: US 11,623,278 B2
(45) Date of Patent: Apr. 11, 2023

(54) EXPEDITIONARY ADDITIVE MANUFACTURING (ExAM) SYSTEM AND METHOD

(71) Applicant: MolyWorks Materials Corporation, Los Gatos, CA (US)

(72) Inventors: Christopher Paul Eonta, Los Gatos, CA (US); Andrew VanOs LaTour, Hayward, CA (US); Matthew Charles, Cloverdale, CA (US); Tom Reed, Hopland, CA (US); Kai Prager, Huntington Beach, CA (US)

(73) Assignee: MolyWorks Materials Corporation, Cloverdale, CA (US)

( * ) Notice: Subject to any disclaimer, the term of this patent is extended or adjusted under 35 U.S.C. 154(b) by 195 days.

(21) Appl. No.: 16/922,098

(22) Filed: Jul. 7, 2020

(65) Prior Publication Data

US 2021/0008621 A1    Jan. 14, 2021

Related U.S. Application Data

(60) Provisional application No. 62/872,312, filed on Jul. 10, 2019.

(51) Int. Cl.
*B22F 9/00* (2006.01)
*B33Y 10/00* (2015.01)
(Continued)

(52) U.S. Cl.
CPC .............. *B22F 9/082* (2013.01); *B22F 10/00* (2021.01); *B22F 10/28* (2021.01); *B22F 10/85* (2021.01);
(Continued)

(58) Field of Classification Search
CPC .......... B22F 10/00; B22F 9/082; B22F 10/10; B22F 2009/0848; B22F 10/85;
(Continued)

(56) References Cited

U.S. PATENT DOCUMENTS 4,750,542 A   6/1988  Harker et al.
5,224,534 A   7/1993  Shimizu et al.
(Continued)

FOREIGN PATENT DOCUMENTS

CN       104550960        4/2015
WO    WO 2017/203245 A1   11/2017

OTHER PUBLICATIONS

International Application No. PCT/US 20/ 41106, The International Search Report and the Written Opinion of the International Searching Authority, dated Dec. 18, 2020, pp. 1-14.
(Continued)

*Primary Examiner* — Anthony M Liang
*Assistant Examiner* — Danny N Kang
(74) *Attorney, Agent, or Firm* — Stephen A. Gratton (57) ABSTRACT

An expeditionary additive manufacturing (ExAM) system for manufacturing metal parts includes a mobile foundry system configured to produce an alloy powder from a feedstock, and an additive manufacturing system configured to fabricate a part using the alloy powder. The additive manufacturing system includes a computer system having parts data and machine learning programs in signal communication with a cloud service. The parts data can include material specifications, drawings, process specifications, assembly instructions, and product verification requirements for the part. An expeditionary additive manufacturing (ExAM) method for making metal parts includes the steps of transporting the mobile foundry system and the additive manufacturing system to a desired location; making the
(Continued)

alloy powder at the location using the mobile foundry system; and building a part at the location using the additive manufacturing system.

14 Claims, 13 Drawing Sheets

(51) Int. Cl.
*B33Y 30/00* (2015.01)
*B22F 10/00* (2021.01)
*B22F 9/08* (2006.01)
*B22F 10/28* (2021.01)
*B22F 12/84* (2021.01)
*B22F 10/85* (2021.01)

(52) U.S. Cl.
CPC .............. *B22F 12/84* (2021.01); *B33Y 10/00* (2014.12); *B33Y 30/00* (2014.12); *B22F 2009/0848* (2013.01)

(58) Field of Classification Search
CPC .... B22F 12/84; B22F 3/24; B22F 8/00; B22F 2009/001; B22F 2203/03; B22F 2999/00; B22F 10/28; B33Y 10/00; B33Y 30/00; B33Y 50/02; B33Y 40/20; B33Y 50/00; Y02P 10/25; Y02W 30/50
See application file for complete search history.

(56) References Cited

U.S. PATENT DOCUMENTS

| | | | |
|---|---|---|---|
| 7,754,519 | B1 | 7/2010 | Tolles et al. |
| 8,871,109 | B2 | 10/2014 | Prabhu et al. |
| 9,399,322 | B2 | 7/2016 | Mulliken |
| 9,925,591 | B2 | 3/2018 | Eonta et al. |
| 10,654,106 | B2 | 5/2020 | Eonta et al. |
| 11,235,389 | B2 | 2/2022 | LaTour et al. |
| 2009/0206065 | A1 | 8/2009 | Kruth et al. |
| 2013/0199611 | A1 | 8/2013 | Murali et al. |
| 2014/0048201 | A1 | 2/2014 | Subbaraman et al. |
| 2014/0252685 | A1 | 9/2014 | Stacker et al. |
| 2014/0374933 | A1* | 12/2014 | Flitsch .................. B29C 64/106 425/62 |
| 2015/0020646 | A1 | 1/2015 | Matsuwaka et al. |
| 2016/0052060 | A1* | 2/2016 | Eonta ...................... F27D 27/00 164/128 |
| 2016/0053346 | A1 | 2/2016 | Szuromi et al. |
| 2016/0199907 | A1 | 7/2016 | Jarvis et al. |
| 2018/0133804 | A1 | 5/2018 | van Hassel et al. |
| 2018/0339456 | A1 | 11/2018 | Czinger et al. |
| 2019/0019787 | A1 | 1/2019 | Park et al. |
| 2020/0086390 | A1 | 3/2020 | LaTour et al. |
| 2020/0189000 | A1 | 6/2020 | LaTour et al. |
| 2022/0168805 | A1 | 6/2022 | LaTour et al. |

OTHER PUBLICATIONS

Tootooni et al., Classifying the Dimensional Variation in Additive Manufactured Parts From Laser-Scanned Three-Dimensional Point Cloud Dat Using Machine Learning Approaches;, Journal of Manufacturing Science and Engineering, vol. 139, No. 9, 2017.
LaTour, "Processing of Metallic Scrap Materials for Battlefield Additive Manufacturing." SBIR.gov, www.sbir.gov/sbirsearch/detail/1256429, pp. 1-2, Award start date Aug. 1, 2016.
International Application No. PCT/US19/41906, International Search Report and Written Opinion of the International Searching Authority, dated Oct. 22, 2019, pp. 1-11.
Pepi, M. et al., Manufacturing at the Point of Need Using recycled, Reclaimed, and/or Indigenous Materials, DSIAC Journal, vol. 5, No. 3, Summer 2018, pp. 26-37.
Abstract SBIR contract solicitation No. 2016.1, "Processing of Metallic Scrap Materials for Battlefield Additive Manufacturing", proposal award date Aug. 1, 2016, pp. 1-3.
International application No. PCT/US 19/62111, International Search Report and the Written Opinion of the International Searching Authority, or the Declaration, dated Feb. 27, 2020, pp. 1-11.
U.S. Appl. No. 16/599,378, filed Oct. 11, 2019, Non-Final Office Action, dated Sep. 30, 2021, pp. 1-13.
AWS Snowball, Secure Edge Computing and Offline Data Transfer, Amazon Web Services, https:/aws.amazon.com/snowball/, pp. 1-9.
Time Series Forecasting Service—Amazon Forecast—Amazon Web Services, https://aws.amazoncom/forecast, pp. 1-9.

* cited by examiner

EXPEDITIONARY ADDITIVE MANUFACTURING (EXAM) SYSTEM AND METHOD

CROSS REFERENCE TO RELATED APPLICATION

This application claims priority from U.S. Provisional No. 62/872,312, filed Jul. 10, 2019, which is incorporated herein by reference.

GOVERNMENT LICENSE RIGHTS

This invention was made with government support under Army SBIR Phase II W911 QX 16 C0025 and Army SBIR Proposal A191-076-0144. The government has certain rights in the invention.

FIELD

This disclosure relates to a system and method of expeditionary additive manufacturing (ExAM).

BACKGROUND

Throughout history, supply chains have decided victory and defeat in armed conflict. In war, the nation with the deadliest warriors does not necessarily win. Victory requires a nation to furnish its soldiers with tools, weapons, clothes, and food. Wars have been won solely due to technological innovations implemented by the victors. For an army to remain unchallenged in global dominance, it must remain at the cutting edge of logistics engineering. Expeditionary manufacturing shows great potential for enhancing army supply chain, equipment maintenance, and combat readiness.

This disclosure relates to an expeditionary additive manufacturing (ExAM) system and method that combines state-of-the-art computer systems with deployable additive manufacturing systems for fabricating metal parts.

SUMMARY

An expeditionary additive manufacturing (ExAM) system for manufacturing metal parts includes: a mobile foundry system configured to produce an alloy powder from a feedstock, and an additive manufacturing system configured to fabricate a part using the alloy powder. The additive manufacturing system includes a computer system having parts data and machine learning programs in signal communication with a cloud service. The parts data can include material specifications, drawings, process specifications, assembly instructions, and product verification requirements for the part. The computer system and cloud service enable the parts data to be used in conjunction with the machine learning programs to allow high versatility and first-time-right production. The expeditionary additive manufacturing can also include a machining system having lathes, milling tools, torches, cutting saws, power tools and measuring devices controlled by the computer system.

In an illustrative embodiment of the expeditionary additive manufacturing (ExAM) system, the additive manufacturing system includes a laser powder bed fusion (LPBF) system having layer-by-layer powder bed monitoring with a negative feedback control loop. Alternately, the additive manufacturing system can include a laser metal deposition (LMD) system or an electron beam melting (EBM) system.

Also in the illustrative embodiment, the mobile foundry system includes a cold hearth mixing system for melting the feedstock and a gas atomization system for forming the alloy powder. The cold hearth mixing system can be configured to operate with scrap metal, such as battlefield scrap, and can include a composition correction system controlled by the computer system permitting the characteristics of the alloy powder to be tailored to the fabrication of a particular metal part.

An expeditionary additive manufacturing (ExAM) method for manufacturing metal parts includes the steps of: providing a mobile foundry system configured to produce an alloy powder from a feedstock; providing an additive manufacturing system configured to fabricate a part using the alloy powder, the additive manufacturing system including a computing system having stored parts data and machine learning programs in signal communication with a cloud service; transporting the mobile foundry system and the additive manufacturing system to a desired location; making the alloy powder at the location using the mobile foundry system; and building the part at the location using the additive manufacturing system. The building step can also include the step of machining the part at the location using a machining system controlled by the computing system. The making of the alloy powder step can also include the step of correcting a composition of the alloy powder to facilitate fabrication of a particular part.

BRIEF DESCRIPTION OF THE DRAWINGS

Exemplary embodiments are illustrated in the referenced figures of the drawings. It is intended that the embodiments and the figures disclosed herein to be considered illustrative rather than limiting.

DETAILED DESCRIPTION

"Expeditionary" means relating to an expedition particularly a military expedition abroad. Expeditionary warfare is the deployment of a state's military to fight abroad, especially away from established bases. "Cloud service" means the on-demand availability of computer system resources, especially data storage and computing power, without direct active management by the user. An exemplary cloud service is Amazon Web Services Inc., Seattle, Wash. 98109. "Machine learning" means an application of artificial intelligence (AI) that provides systems the ability to automatically learn and improve from experience without being explicitly, programmed. In the present application, machine learning includes computer programs that can access parts data and use it to control additive manufacturing and machining systems to make parts.

Figure 1:
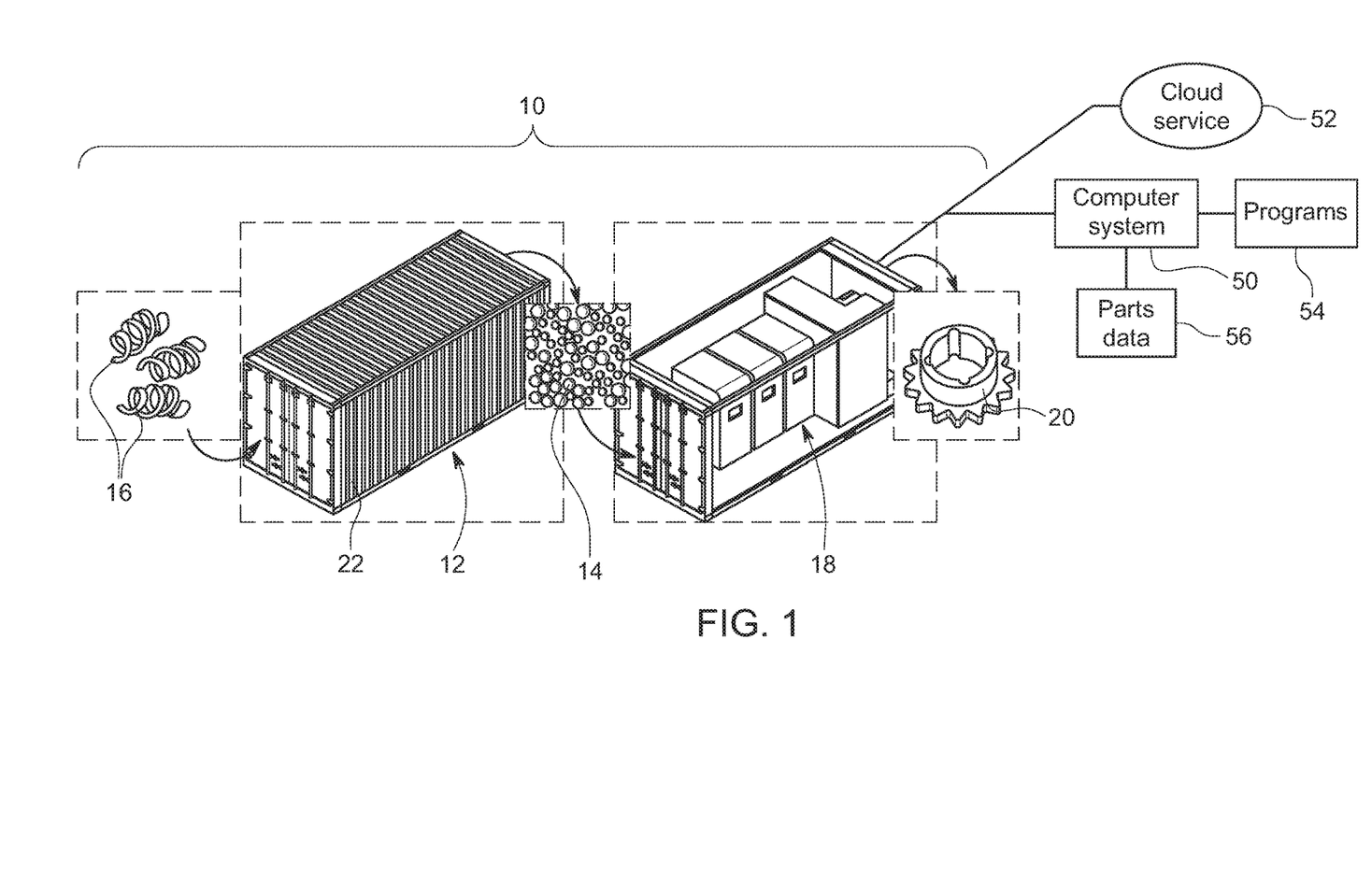
FIG. 1 is a schematic drawing illustrating operational characteristics of a first embodiment (Type III) expeditionary additive manufacturing (ExAM) system.

Referring to FIG. 1, an expeditionary additive manufacturing (ExAM) system 10 for manufacturing metal parts includes: a mobile foundry system 12 configured to produce an alloy powder 14 from a feedstock 16, and an additive manufacturing system 18 configured to fabricate a metal part 20 using the alloy powder 14.

Figure 2A:
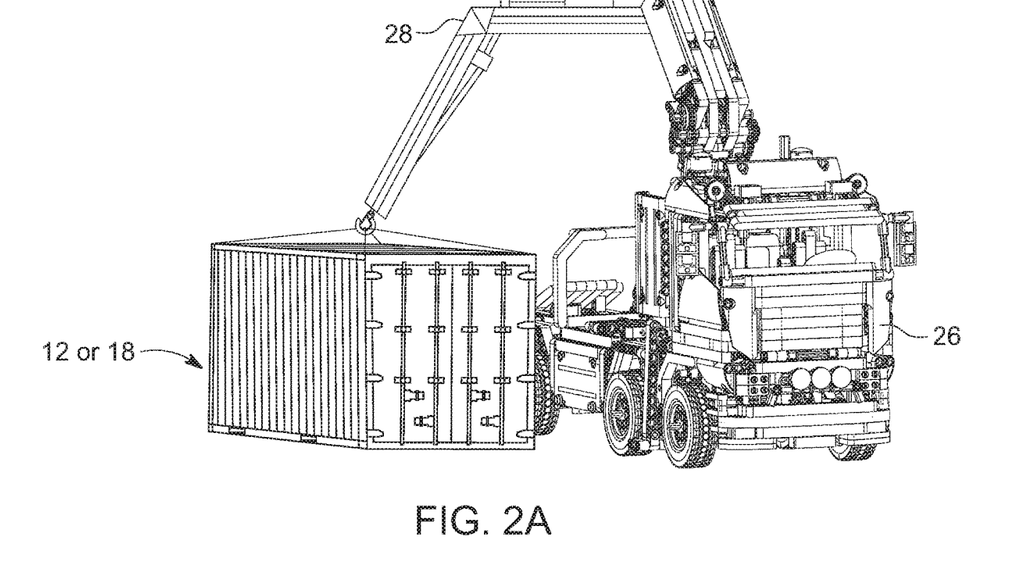
FIGS. 2A-2E are schematic drawings illustrating steps of an expeditionary additive manufacturing (ExAM) method performed using the expeditionary additive (ExAM) manufacturing system.

The mobile foundry system 12 includes a container 22 sized to contain the necessary equipment. For example, the container 22 can comprise a standard sized metal shipping container that can be easily transported by truck, rail or ship. Exemplary sizes include 8'×20' and 8'×40'. The container 22 can include access openings, such as doors or hatches, sized to allow people, raw materials, equipment, and metal parts into and out of the containers 22. As shown in FIG. 2A, the mobile foundry system 12 can be transported to a desired location using a truck 26 having a crane 28.

Figure 2B:
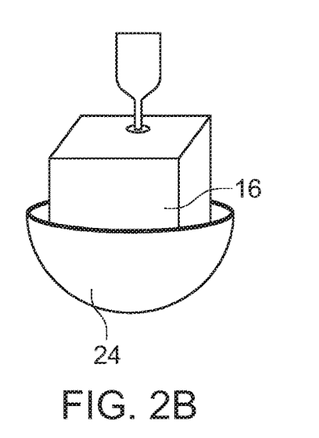
Figure 2C:
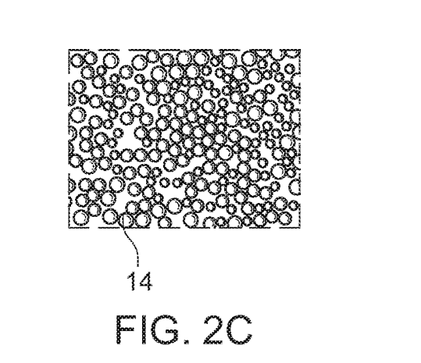
Figure 2D:
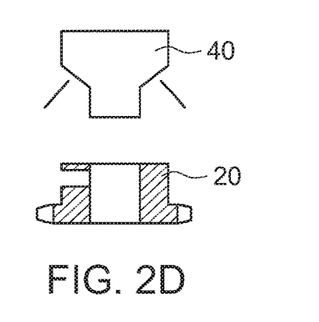

The mobile foundry system 12 is configured to produce the alloy powder 14 at the desired location using a cold hearth mixing and atomization process. In the illustrative embodiment, the mobile foundry system 12 includes a cold hearth mixing system 24 (FIG. 2B) and an atomization system (not shown) for making the alloy powder 14. U.S. Pat. No. 9,925,591 B2 entitled "Mixing Cold Hearth Metallurgical System and Process For Producing Metals and Metal Alloys", which is incorporated herein by reference, describes some of the foundry equipment that can be used in the mobile foundry system 12. Exemplary feedstocks 16 include scrap, recycled metal, waste, indigenous materials, or a combination of feedstocks.

Figure 2E:
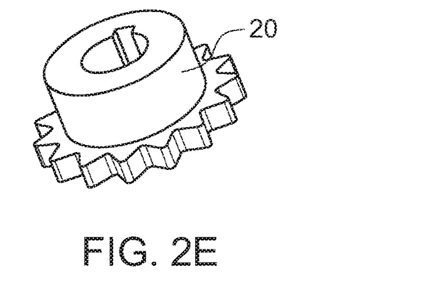

As shown in FIGS. 2A-2E, a method of manufacturing parts using the expeditionary additive manufacturing (ExAM) system 10 includes the steps of: transporting the mobile foundry system 12 and the additive manufacturing system 18 to a desired location (FIG. 2A), making the alloy powder 14 using the feedstock 16 (FIG. 2B), and performing additive manufacturing (FIG. 2D) to build the part 20 (FIG. 2E).

Figure 3A:
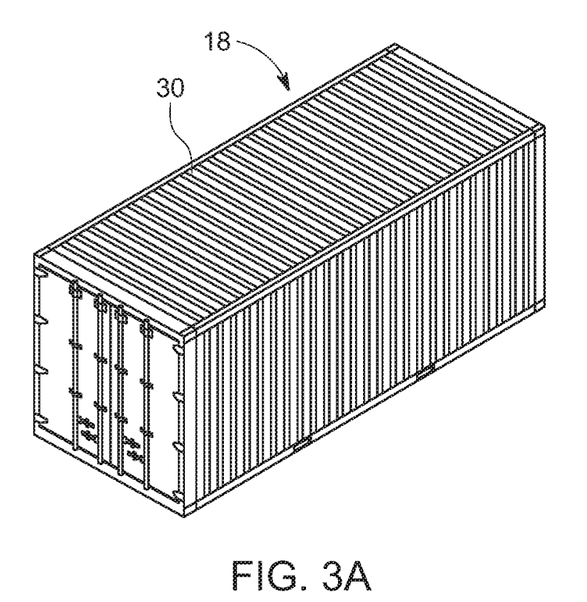
FIG. 3A is a schematic perspective drawing of the additive manufacturing system in a closed container configuration.
Figure 3B:
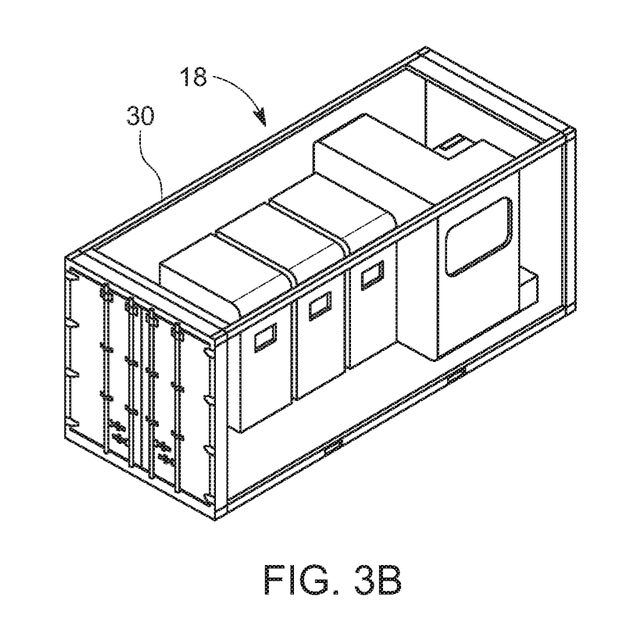
FIG. 3B is a schematic perspective drawing of the additive manufacturing system in an open container configuration.
Figure 3C:
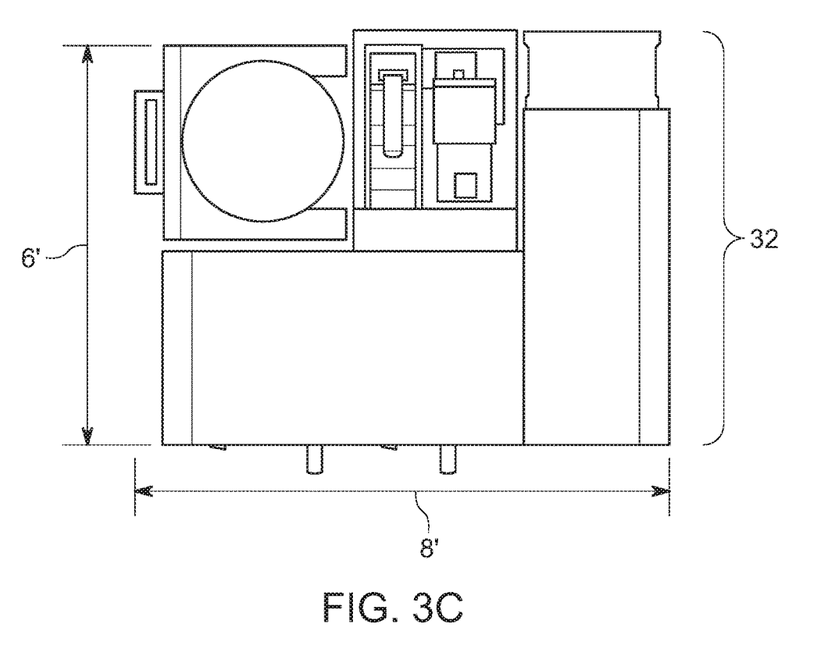
FIG. 3C is a schematic block drawing of a laser powder bed system of the additive manufacturing system.
Figure 3D:
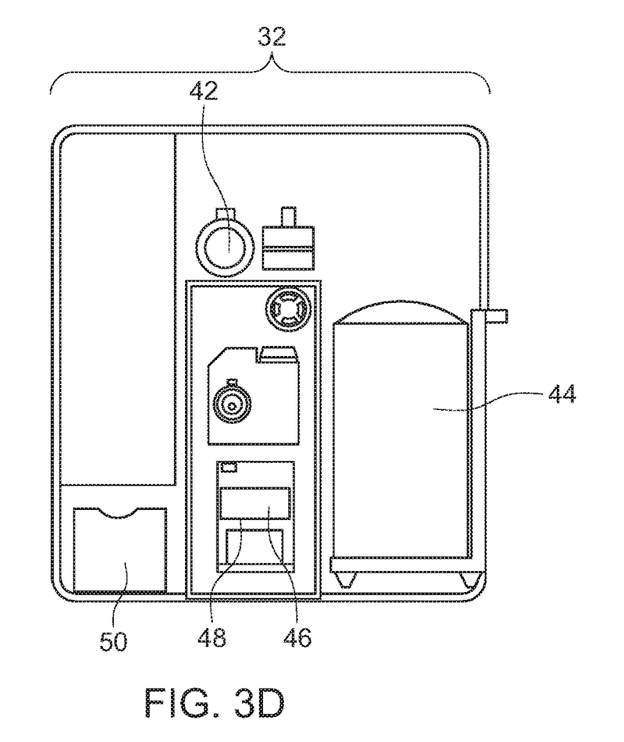
FIG. 3D is a schematic cut away drawing of the laser powder bed system of the additive manufacturing system.
Figure 3E:
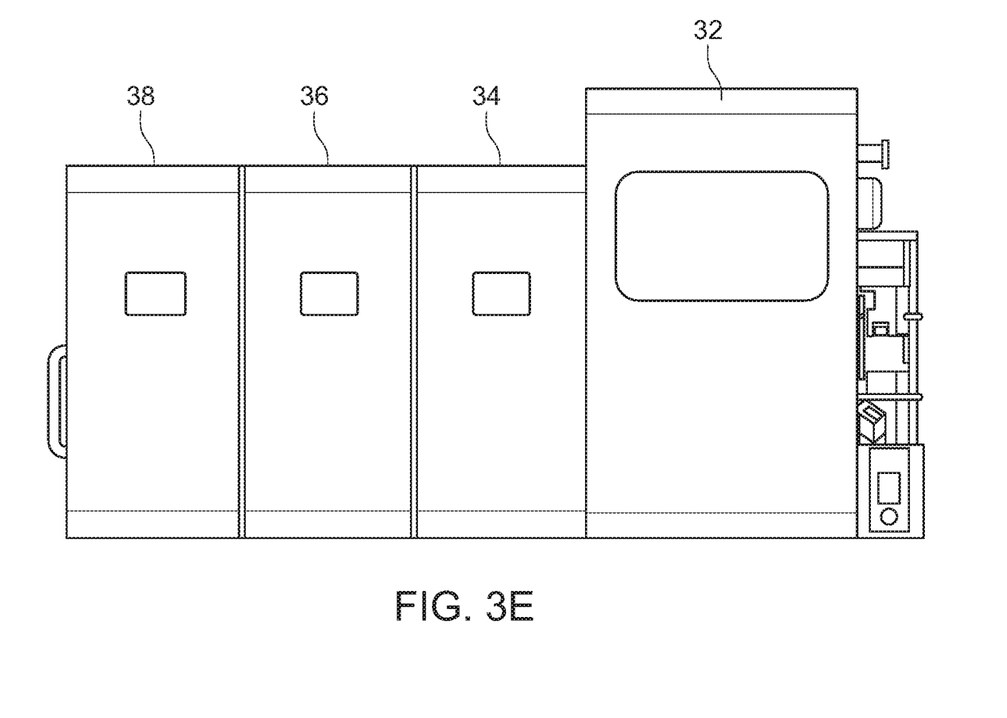
FIG. 3E is a schematic block drawing of the systems of the additive manufacturing system.

Referring to FIGS. 3A-3E, the additive manufacturing system 18 can include a container 30, such as a standard sized metal shipping container, that can be easily transported by truck, rail or ship, substantially as previously described for container 22 (FIG. 1). FIG. 3A illustrates the container 22 in a closed configuration. FIG. 3B illustrates the container 22 in an open configuration. FIG. 3E illustrates various systems of the additive manufacturing system 18 including: a laser powder bed fusion (LPBF) system 32, a powder evacuation and heat treatment system 34, a part removal and build plate renewal system 36 and an inspection system 38. FIG. 3C is a block view of the laser powder bed fusion (LPBF) system 32 showing all components fitting within an 8 foot×6 foot constraint. The additive manufacturing system 18 can provide material utilization as high as 70% as compared to as low as 3% for subtractive manufacturing (i.e., 97% of material converted into turnings). Additionally, all metal waste streams including chips, turnings, and revert can be recycled in the mobile foundry system 12, increasing single-pass material utilization to 90%.

As shown in FIG. 3D, the laser powder bed fusion (LPBF) system 32 can include a 3D printer 40, a blower 42, a filter 44, a chiller 46, and a vacuum pump 48. In an illustrative embodiment the laser powder bed fusion (LPBF) system 32 can include a modified EOS M100 3D-Printer 40 manufactured by EOS GmbH Electro Optical Systems. As also shown in FIG. 3D, the laser powder bed fusion (LPBF) system 32 also includes a computer system 50 in signal communication with a cloud service 52. One suitable cloud service 52 is a commercially available, web-scale computing service available from Amazon Web Services Inc., Seattle, Wash., known as the AWS SNOWBALL EDGE. As will be further explained, the computer system 50 can also include machine learning computer programs 54 (FIG. 1) and parts data 56 (FIG. 1).

Figure 4A:
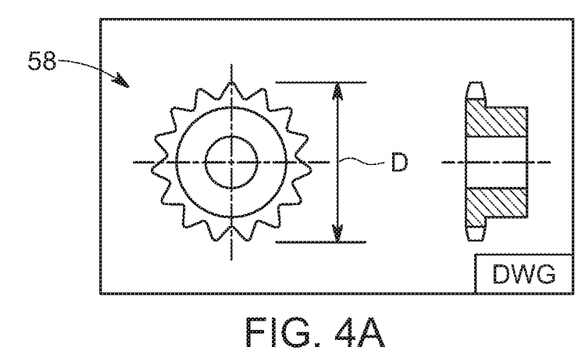
FIGS. 4A-4E are schematic drawings illustrating steps in the expeditionary additive (ExAM) manufacturing method.
Figure 4B:
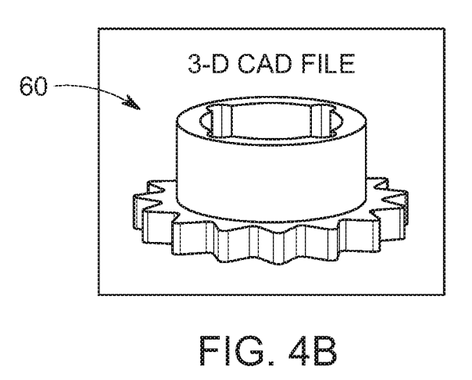
Figure 4C:
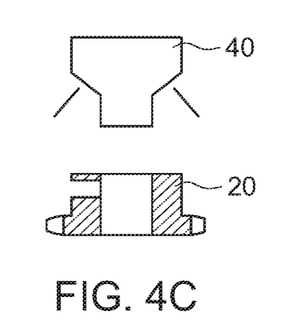
Figure 4D:
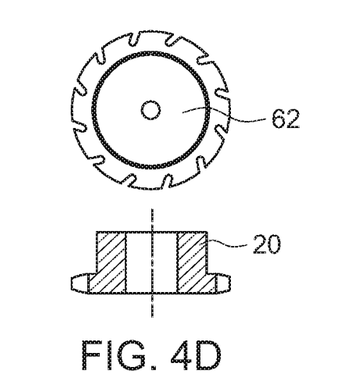
Figure 4E:
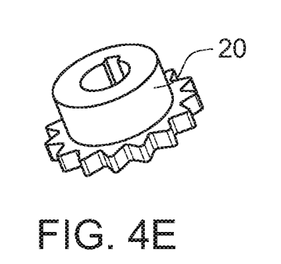

Referring to FIGS. 4A-4E, further details of the additive manufacturing step of the (ExAM) method for manufacturing metal parts are illustrated. Initially, as shown in FIG. 4A, parts data in the form of a drawing 58 of the part 20 in digital form is provided by the computer system 50 (FIG. 1). The drawing 58 can be contained in the PARTS DATA 56 (FIG. 1), which can comprise a digital inventory of a desired number of parts (e.g., 100) on a suitable digital storage medium, such as one provided by the cloud service 52 (FIG. 1). Next, as shown in FIG. 4B, a 3D CAD file 60 with support structures is made using computer programs 54 (FIG. 1) associated with the computer system 50 (FIG. 1). Next, as shown in FIG. 4C, a building step can be performed using the 3-D printer 40 and programs 54 (FIG. 1) associated with the computer system 50 (FIG. 1). Next as shown in FIG. 4D, a sawing step can be performed using a saw 62 of the additive manufacturing system 18, to separate the part 20 from the build plate (not shown). FIG. 4E illustrates the completed part 20.

Figure 5A:
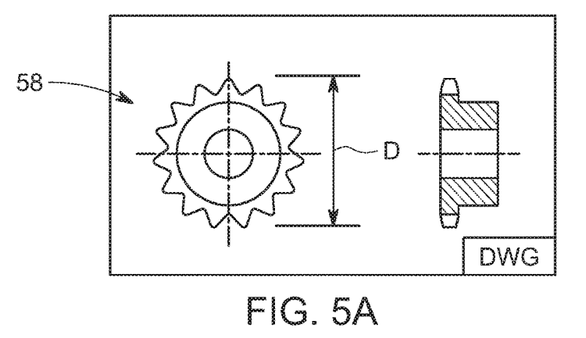
FIGS. 5A-5D are schematic drawings illustrating a building step of the expeditionary additive (ExAM) manufacturing method.
Figure 5B:
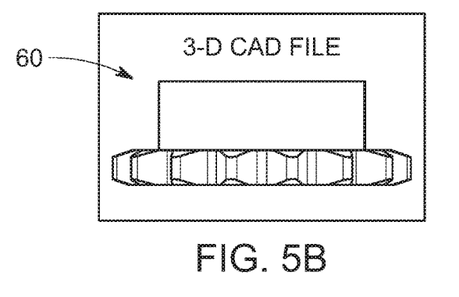
Figure 5C:
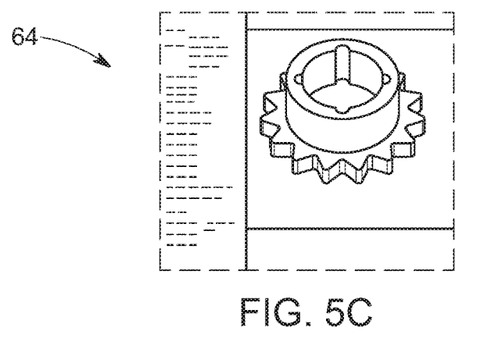
Figure 5D:
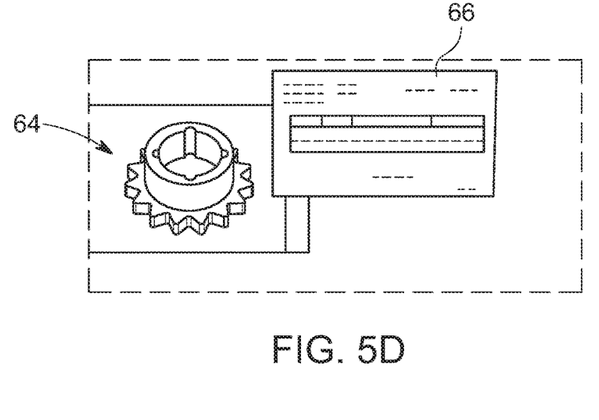

Referring to FIGS. 5A-5D, further details of the additive manufacturing step of the (ExAM) method for manufacturing metal parts are illustrated. Initially, as shown in FIG. 5A, parts data in the form of the drawing 58 of the part 20 in digital form is provided by the computer system 50 (FIG. 1), substantially as previously described. Next, as shown in FIG. 5B, a 3D CAD file 60 is made by the computer system 50 (FIG. 1) substantially as previously described. Next, as shown in FIG. 5C, the CAD file 60 is imported to a 3DXpert file 64 with support structures (not shown) added. 3DXpert is an all-in-one integrated software configured to prepare, optimize and manufacture 3D CAD models using additive manufacturing (AM). 3DXpert is available from 3D Systems, Inc. of US and Canada. Next, as shown in FIG. 5D, the printing process is performed by the 3-D printer 40 substantially as previously described, and is controlled layer by layer by the computer system 50 (FIG. 1). In FIG. 5D, parameters of the control process can be monitored as indicated by a real time or recorded printing computer screen 66 from the computer system 50 (FIG. 1). The monitoring of these parameters can serve as a basis for machine learning for fabricating other parts identical or similar to the part 20.

Figure 6A:
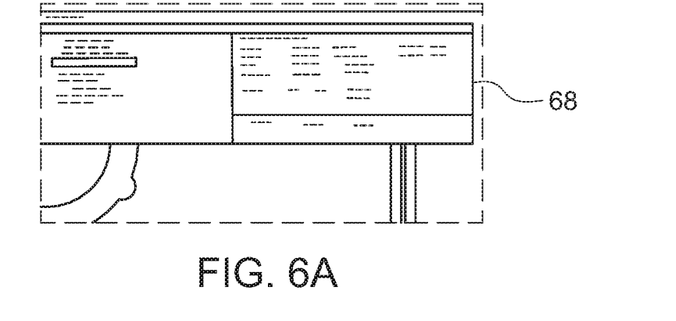
FIGS. 6A-6C are schematic drawings further illustrating aspects of the building step of the method.
Figure 6B:
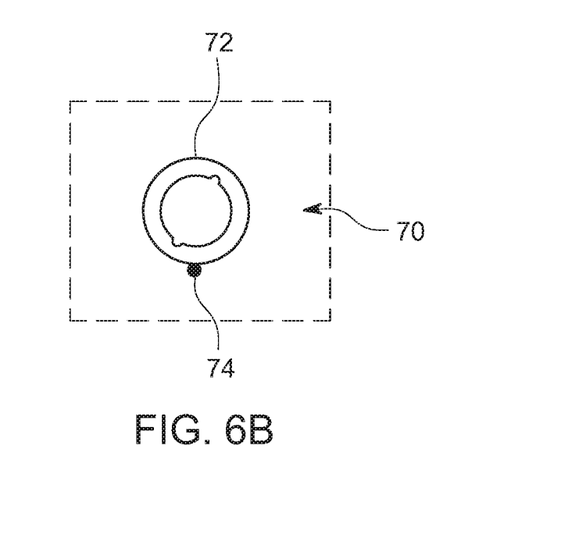
Figure 6C:
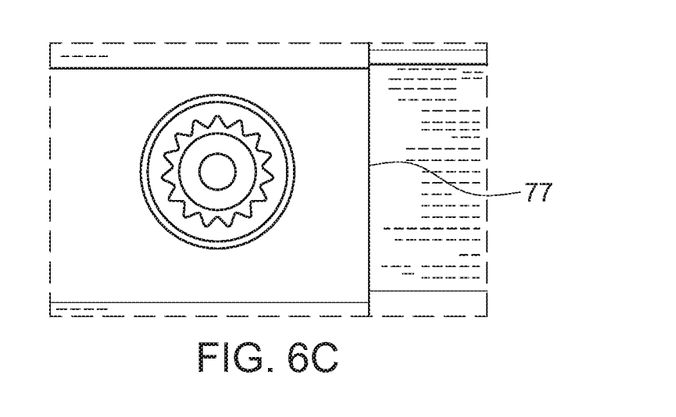

Referring to FIGS. 6A-6C, further details of the additive manufacturing step of the (ExAM) method for manufacturing metal parts including machine learning features are illustrated. FIGS. 6A-6C involve the layer by layer printing of the part 20 during the building step of the method using the 3-D printer 40. Initially, as shown in FIG. 6A, the step of calculating parameters for each layer being printed such as power, printing speed, and input energy is performed as indicated by calculating computer screen 68. In FIG. 6B, one printed slice 72 of hundreds is calculated as indicated by the printing slice computer screen 70. A witness pin slice 74 for chemical analysis can also be printed on a surface of the part 20. FIG. 6C illustrates a 3D printer screen 77 showing the printed slice 72 and the witness pin slice 74 being printed.

Figure 7A:
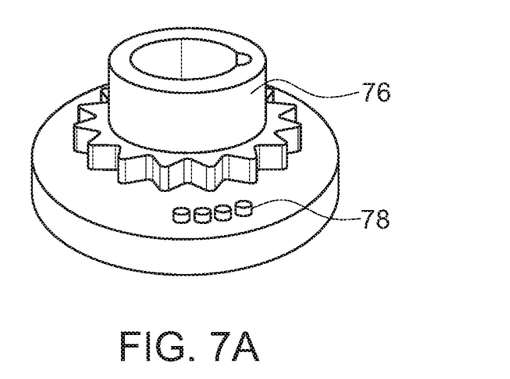
FIGS. 7A-7C are schematic drawings illustrating a machining step of the expeditionary additive (ExAM) manufacturing method performed using a lathe.
Figure 7B:
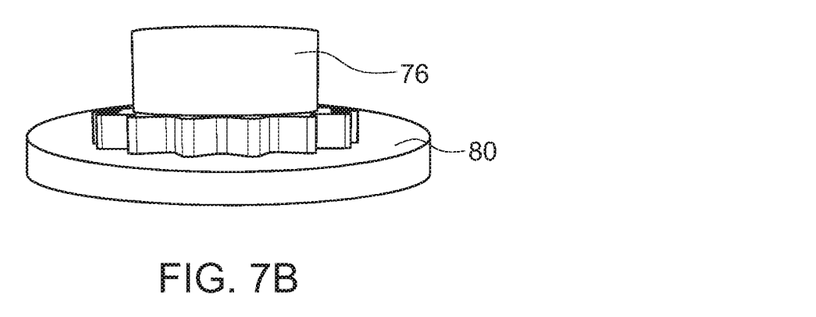
Figure 7C:
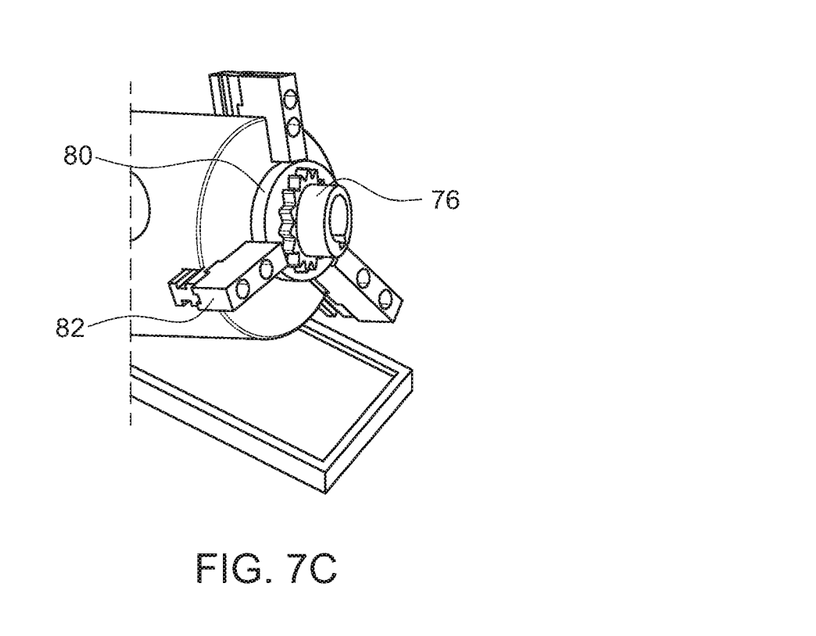

Referring to FIGS. 7A-7C, further details of the additive manufacturing step of the (ExAM) method for manufacturing metal parts are illustrated. FIG. 7A illustrates an as printed part 76 and witness pins 78 post-printing. FIG. 7B illustrates a support plate 80 for performing the printing step. FIG. 7C shows a band saw 82 removing the support plate 80 from the as printed part 76.

Figure 8A:
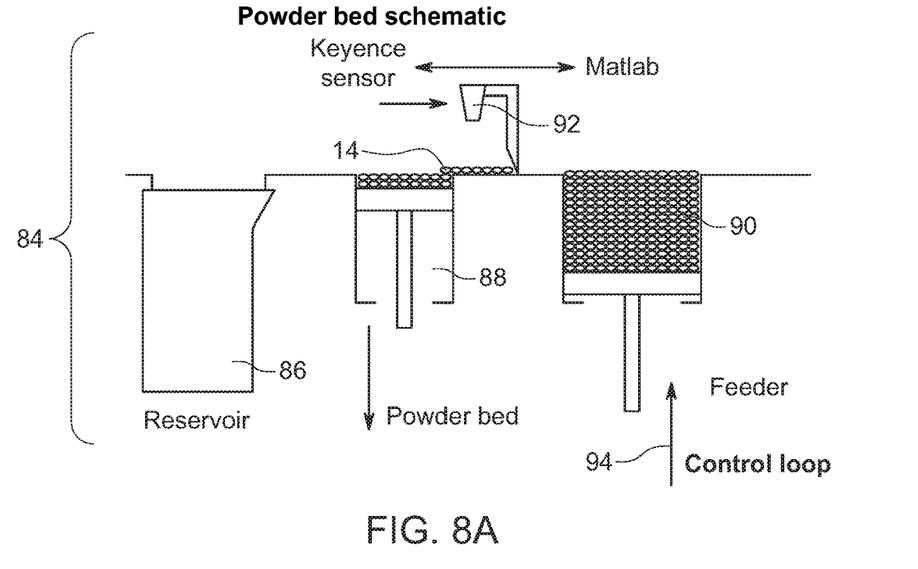
FIG. 8A is a schematic drawing of a powder bed fusion monitoring step of the expeditionary additive (ExAM) manufacturing method.
Figure 8B:
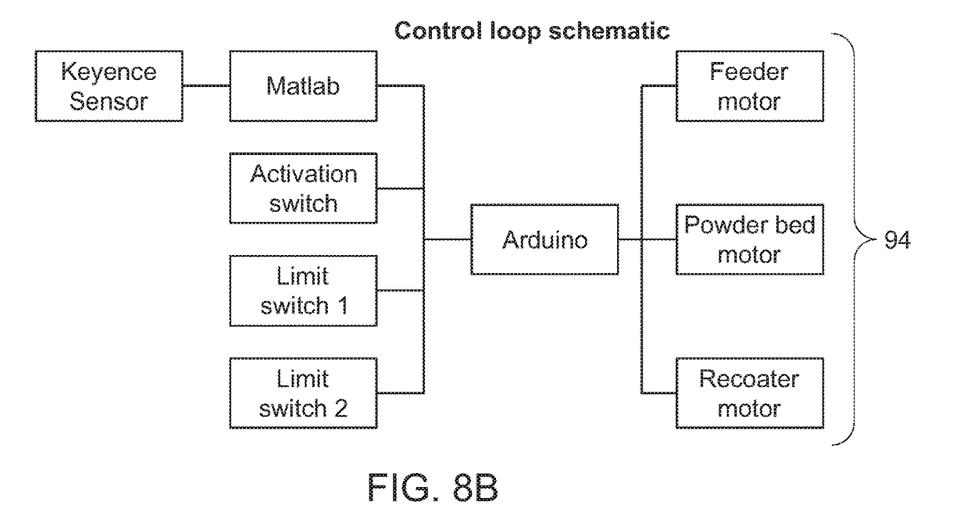
FIG. 8B is a control schematic drawing illustrating a process control pathway of the powder bed fusion monitoring step.
Figure 8C:
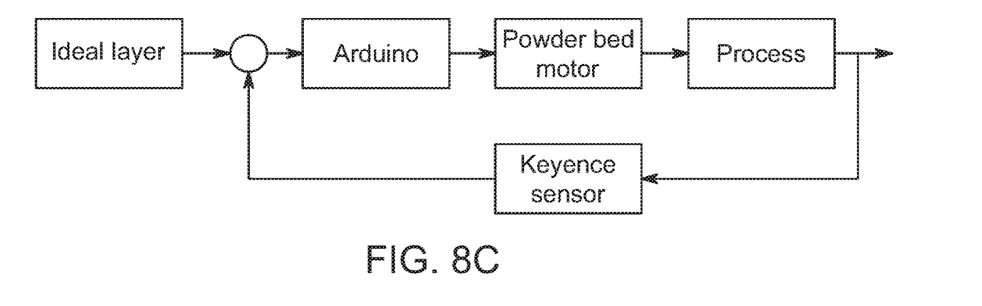
FIG. 8C is a schematic drawing illustrating a negative feedback control loop of the powder bed fusion monitoring step.

Referring to FIGS. 8A-8C, a powder bed monitoring step of the (ExAM) method for manufacturing metal parts is illustrated. In FIG. 8A, a powder bed system 84 includes a powder reservoir 86, a powder bed 88, a feeder 90 and a recoater 92 controlled by a control loop 94 and configured to deposit the powder 14 layer by layer during the 3-D printing step of the method. As shown in FIG. 8B, a KEYENCE sensor manufactured by Keyence Inc., US is in signal communication with a MATLAB program manufactured by MathWorks, US. The MATLAB program receives input from the KEYENCE sensor for operating a feeder motor, a powder bed motor and a recoater motor using an ARDUINO controller manufactured by Arduino, US. The ARDUINO controller also receives input from an activation switch, a limit switch 1, and a limit switch 2 configured to track the movement limits of the recoater 92. FIG. 8C illustrates a negative feedback loop through the KEYENCE sensor for controlling the powder bed motor as a function of process input.

Figure 9:
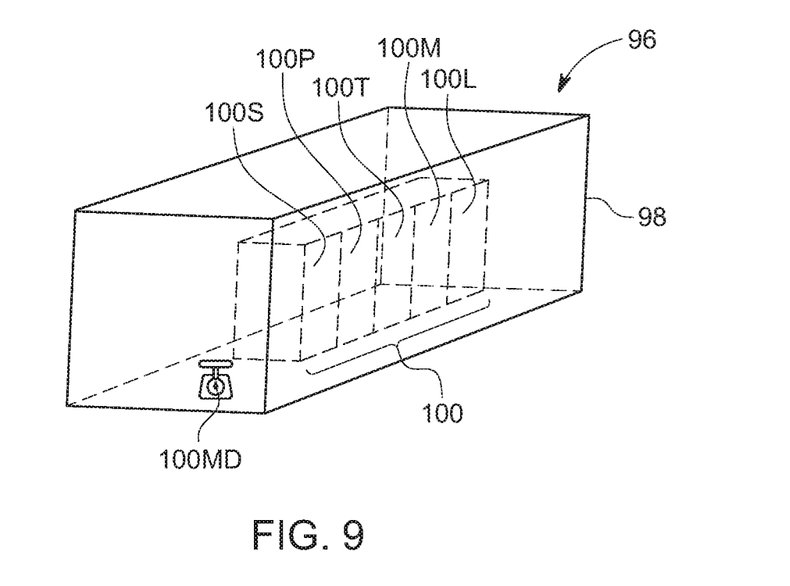
FIG. 9 is a schematic drawing illustrating a machining system of the expeditionary additive manufacturing (ExAM) system.

Referring to FIG. 9, a machining system 96 of the expeditionary additive manufacturing (ExAM) system 10 is illustrated. The machining system 96 can include a container 98 such as a shipping container substantially as previously described for containers 22 and 30. A metal working machine shop set (MWMSS) 100 within the container 98 includes a variety of tools such as a computer-automated lathe 100L, a milling machine 100M, a torch 100T, a power tool 100P, a metal cutting saw 100S and a measuring device 100MD.

Figure 10A:
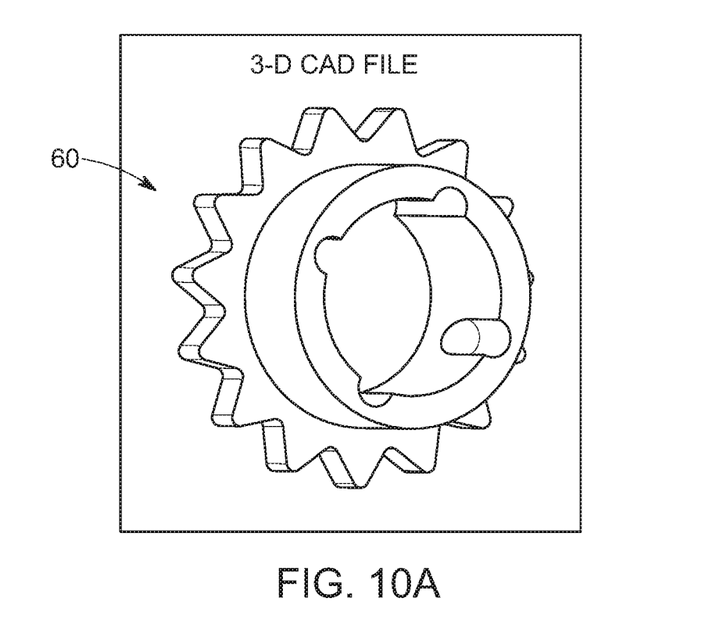
FIGS. 10A-10C are schematic drawings illustrating a machining step of expeditionary additive manufacturing (ExAM) method performed using a facing tool.
Figure 10B:
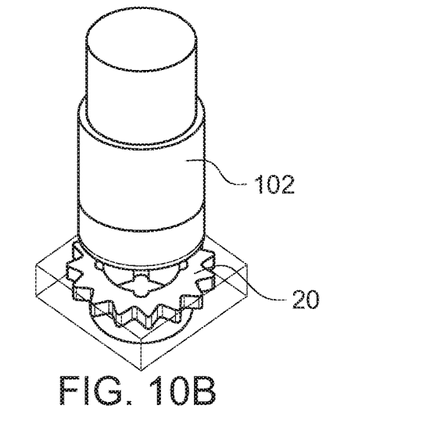
Figure 10C:
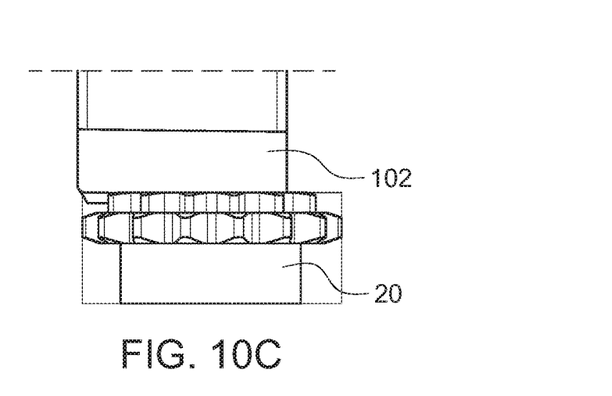
Figure 11:
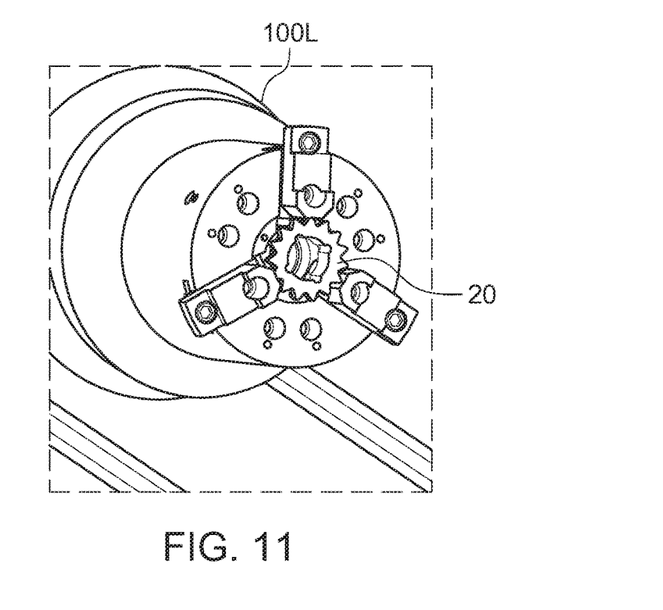
FIG. 11 is a schematic drawing illustrating a machining step of expeditionary additive manufacturing (ExAM) method performed using a lathe.

Referring to FIGS. 10A-10C, a machining step is illustrated using a lathe facing tool 102 of the computer-automated lathe 100L of the metal working machine shop set (MWMSS) 100. As shown in FIG. 10A, the 3-D CAD file 60 of the part 20 is uploaded into masterCAM a program for the computer-automated lathe 100L. FIGS. 10B and 10C illustrate a facing operation on the part 20 using the lathe facing tool 102. FIG. 11 illustrates the part 20 mounted on the computer-automated lathe 100L.

Figure 12A:
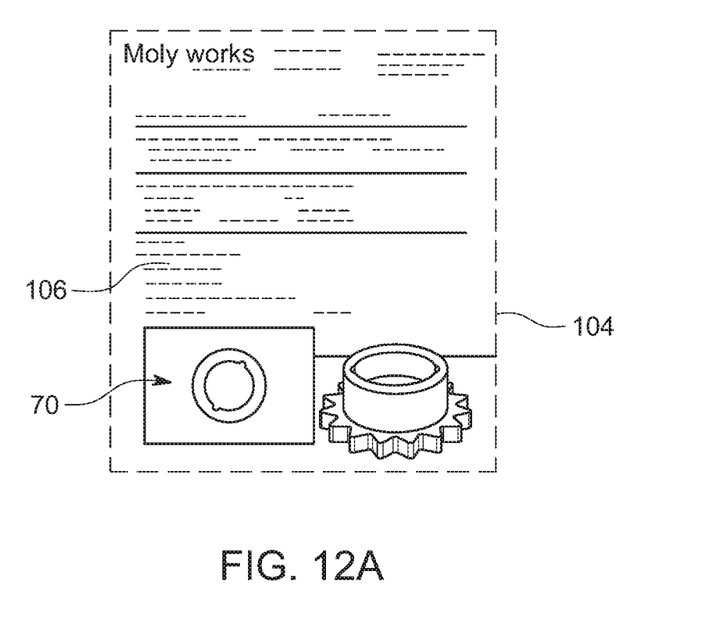
FIG. 12A is a schematic drawing illustrating a computer screen with an automatically generated report.
Figure 12B:
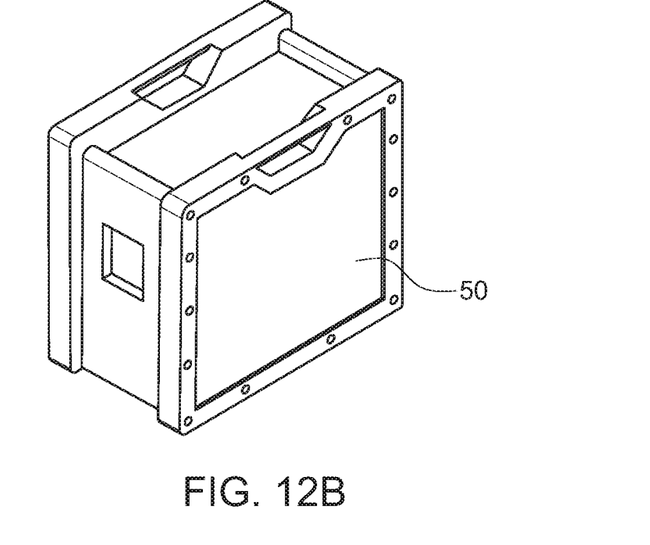
FIG. 12B is a perspective drawing illustrating a computer system of the expeditionary additive manufacturing (ExAM) system.

Referring to FIGS. 12A and 12B, the computer system 50 includes a monitor 104 on which a build report 106 showing material, processing, and post processing information is automatically generated by the computer programs 54 (FIG. 1). The computer system 50 can be ruggedly designed to withstand a fall from a 5-story building. The computer programs 54 can also be configured to generate other reports including: 1.) analysis of hopper powder (e.g., oxygen, nitrogen, hydrogen content, particle size distribution, powder microscopy). 2.) part build properties 3.) a source log of lots of powder with a run log entering the powder in the database and assigning a run name 4.) a printer log used to record all build information including hopper build logs, post processing data and 3D CAD build files. All of this information permit machine learning to occur during operation of the expeditionary additive manufacturing (ExAM) system 10.

EXAMPLE

A manufacturing data package can be developed for each part, including data for all aspects of production (i.e. material specifications, drawings, process specifications, assembly instructions, and product verification requirements such as dimensional inspection, non-destructive testing, test coupons, and layer-by-layer inspection). By way of example, a digital inventory of the top 100 field requested parts from TARDEC can be established. MolyWare, proprietary database software developed by MolyWorks, 238 North Santa Cruz Avenue, Suite 106B, Los Gatos, Calif. 95030, contain all written digital threads for the top 100 parts. Each printing step has an associated log in MolyWare for data collection.

In order to access digital threads, the U.S. Army Research, Development, and Engineering Command (RDECOM) developed a database called the Repository of Additive Parts for Tactical & Operational Readiness (RAPTOR). It is easy-to-use, already in-service, and equipped with a powerful search function that can filter through parts with options such as material, system type, and National Stock Number.

MolyWorks has partnered with Amazon Web Services (AWS) in order to provide petabyte-scale data transport with on-board storage and compute capabilities.

Amazon's Snowball Edge can undertake local processing and edge-computing workloads in addition to transferring data between your local environment and the AWS Cloud. Tamper resistant enclosures, 256-bit encryption, and industry-standard Trusted Platform Modules (TPM) provide the necessary security and full chain of custody when deployed. Finally, the Snowball is ruggedly designed to withstand a fall from a 5-story building. The Snowball Edge has a local 100 TB storage which can be scaled by connecting multiple Snowball Edges together. Amazon's S3 cloud storage system will be used for storage management, RAPTOR digital thread backup, and integration with Amazon Forecast.

Forecast is Amazon's predictive machine learning system. Users upload data to the encryption-protected Forecast servers, which then transmit a forecasting model. In the context of RAPTOR, predictive maintenance will be explored utilizing the growing number of data points. Scrap availability, past part demand, forward-deployed manufacturing capacity, and part-life data will all be taken into account.

The systems developed in the Mobile Foundry and ExAM require control. AWS Robomaker is a service to develop and deploy intelligent robotics. MolyWorks is working directly with developers to create and fine tune applications for this service. Robomaker is appealing due to its machine learning and monitoring services. When ExAM is scaled, Robomaker will enable fleet management of the robotic system.

Producing the part from drawing to post-processing requires various file formats and software. Table 1 lists all software and files written, drawn, and programmed for the part modeling, 3D printing, and post processing.

TABLE 1

| Name | Extension | Software | Description |
|---|---|---|---|
| Solid Part | .sldprt | solidworks | 3D image format used by SolidWorks CAD software. It contains a 3D object or "part" that may be combined with other parts into a single assembly. |
| Solid Drawing | .slddrw | solidworks | Two-dimensional drawing created with SolidWorks CAD software; saves image data in vector format using lines instead of pixels. |
| Slice Files | .sli | 3DXpert | The part is broken down layer by layer into specified thicknesses for printing. |
| Event List Text File | .elt | 3DXpert | 3D Systems proprietary extension used when saving and opening 3DXpert printing files. |
| EOS Job Data | .eosjob | EOS Print | Job file containing laser scan path data. |
| EOS Job Zip | .eosjz | EOS Print | Zip file containing job data as well as laser parameters, .sli files, and other relevant data necessary for recreating the exact print. |
| masterCAM | .mcam | masterCAM | File created by masterCAM from .stl; contains a part's 3D drawing for the user to input machining instructions in masterCAM program. |
| Numerical Control | .NC | masterCAM | File created by masterCAM as an export from .mcam; contains numerical controls for directing a machining tool such as a mill and a lathe. |
| Portable Document Format | .pdf | MolyWare, Microsoft Word | The PDF format is commonly used for saving documents and publications in a standard format that can be viewed on multiple platforms. Solidworks drawing is converted to PDF for the part report and linked to in MolyWare so people without SolidWorks can open it. Also used for quality checking relevant dimensions. |
| Portable Network Graphic | .png | MolyWare, Microsoft Word | A PNG file is an image file stored in the Portable Network Graphic (PNG) format. It contains a bitmap of indexed colors and uses lossless compression. Used for displaying the sprocket machining, printing, and screenshots of 3D modeling in reports. |

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. An expeditionary additive manufacturing (ExAM) system for manufacturing metal parts comprising:
   a mobile foundry system configured to produce an alloy powder from a feedstock, the mobile foundry system comprising a cold hearth mixing system for melting the feedstock and a gas atomization system for forming the alloy powder;
   an additive manufacturing system configured to fabricate a part using the alloy powder, the additive manufacturing system comprising a computer system having a plurality of computer programs configured to access parts data including material specifications, drawings, process specifications, assembly instructions and product verification requirements on a top 100 field requested parts; and
   a machining system controllable by the computer system and configured to machine the part using the parts data.

2. The ExAM system of claim 1 wherein the mobile foundry system comprises a first container containing the cold hearth mixing system and the gas atomization system, and the additive manufacturing system comprises a second container containing the computer system.

3. The ExAM system of claim 1 wherein the additive manufacturing system includes a laser powder bed fusion (LPBF) system having layer-by-layer powder bed monitoring with a negative feedback control loop.

4. The ExAM system of claim 1, wherein the machining system includes machinery selected from the group consisting of lathes, milling tools, torches, cutting saws, power tools and measuring devices controlled by the computer system.

5. The ExAM system of claim 1 wherein the machining system comprises a metal working machine shop set (MWMSS).

6. The ExAM system of claim 1 wherein the additive manufacturing system includes a powder bed system controllable by the computer system.

7. The ExAM system of claim 1 wherein the additive manufacturing system includes a 3-D printer controllable by the computer system.

8. The ExAM system of claim 1 wherein the feedstock comprises scrap metal and the cold hearth mixing system is configured to perform composition correction for the alloy powder.

9. The ExAM system of claim 1 wherein the computer programs include a search function configured to filter the parts data.

10. An expeditionary additive manufacturing (ExAM) system for manufacturing metal parts comprising:
   a mobile foundry system configured to produce an alloy powder from a feedstock, the mobile foundry system comprising a first shipping container and a cold hearth mixing system in the first shipping container for melting the feedstock and a gas atomization system in the first shipping container for forming the alloy powder;
   an additive manufacturing system configured to fabricate a part using the alloy powder, the additive manufacturing system comprising a second shipping container and a laser powder bed fusion (LPBF) system in the second shipping container having layer-by-layer powder bed monitoring with a negative feedback control loop, a computer system having a plurality of computer programs configured to access parts data including material specifications, drawings, process specifications, assembly instructions, and product verification requirements on a top 100 field requested parts; and
   a machining system controllable by the computer system and configured to machine the part using the parts data, the machining system comprising a third shipping container and a metal working machine shop set (MWMSS) in the third shipping container.

11. The ExAM system of claim 10 wherein the feedstock comprises scrap metal and the cold hearth mixing system is configured to perform composition correction for the alloy powder.

12. The ExAM system of claim 10 wherein the machining system including machinery selected from the group consisting of lathes, milling tools, torches, cutting saws, power tools and measuring devices controlled by the computer system.

13. The ExAM system of claim 10 wherein the feedstock comprises battlefield scrap.

14. The ExAM system of claim 10 wherein the computer programs include a search function configured to filter the parts data.

* * * * *